(12) United States Patent
Huang et al.

(10) Patent No.: US 12,509,063 B2
(45) Date of Patent: Dec. 30, 2025

(54) METHOD AND APPARATUS FOR PLANNING AUTOMATIC PARKING PATH, AND MEDIUM AND DEVICE

(71) Applicant: Momenta (Suzhou) Technology Co., Ltd., Suzhou (CN)

(72) Inventors: Zhengming Huang, Suzhou (CN); Xu Ran, Suzhou (CN); Bo Tian, Suzhou (CN); Zhijiang Xu, Suzhou (CN); Yunfeng Gu, Suzhou (CN)

(73) Assignee: Momenta (Suzhou) Technology Co., Ltd., Suzhou (CN)

( * ) Notice: Subject to any disclaimer, the term of this patent is extended or adjusted under 35 U.S.C. 154(b) by 167 days.

(21) Appl. No.: 18/230,303

(22) Filed: Aug. 4, 2023

(65) Prior Publication Data

US 2023/0373469 A1 Nov. 23, 2023

Related U.S. Application Data

(63) Continuation of application No. PCT/CN2022/083294, filed on Mar. 28, 2022.

(30) Foreign Application Priority Data

Dec. 28, 2021 (CN) .......................... 202111626377.4

(51) Int. Cl.
*B60W 30/06* (2006.01)
*G06V 10/26* (2022.01)
(Continued)

(52) U.S. Cl.
CPC ........... *B60W 30/06* (2013.01); *G06V 10/273* (2022.01); *G06V 10/44* (2022.01); *G06V 20/586* (2022.01);
(Continued)

(58) Field of Classification Search
CPC ........... B60W 30/06; B60W 2420/403; B60W 2552/53; B60W 2554/20; B60W 30/0956;
(Continued)

(56) References Cited

U.S. PATENT DOCUMENTS

| | | | |
|---|---|---|---|
| 2021/0179088 A1* | 6/2021 | Nakada | B62D 15/0285 |
| 2021/0291812 A1* | 9/2021 | Otake | B62D 15/0285 |
| 2023/0174054 A1* | 6/2023 | Yamada | B60W 30/06 |
| | | | 701/41 |

FOREIGN PATENT DOCUMENTS

| | | |
|---|---|---|
| CN | 110497901 A | 11/2019 |
| CN | 111016886 A | 4/2020 |

(Continued)

OTHER PUBLICATIONS

China National Intellectual Property Administration, International Search Report, Application No. PCT/CN2022/083294, mailed Sep. 22, 2022, 4 pages.

*Primary Examiner* — Daryl C Pope
(74) *Attorney, Agent, or Firm* — JCIPRNET (57) ABSTRACT

The present disclosure provides a method and an apparatus for planning an automatic parking path, a medium and a device and belongs to the field of self driving technologies. The method includes: extracting perception information within a predetermined parking space including a target vehicle place, which is perceived by a vehicle; based on the perception information, identifying a ground sideline of the target parking place, a road sideline and an actual obstacle contour line; cropping the ground sideline and the road sideline intersecting with the ground sideline and taking remaining ground sideline and road sideline as corresponding boundaries of an available parking space of the target parking place; and, performing collision detection based on the corresponding boundaries of the available parking space and the actual obstacle contour line, and based on a result of
(Continued)

the collision detection, performing vehicle trajectory planning to obtain an automatic parking planning path.

11 Claims, 4 Drawing Sheets

(51) Int. Cl.
  *G06V 10/44* (2022.01)
  *G06V 20/56* (2022.01)
  *G06V 20/58* (2022.01)
(52) U.S. Cl.
  CPC ..... *G06V 20/588* (2022.01); *B60W 2420/403* (2013.01); *G06V 2201/07* (2022.01)
(58) Field of Classification Search
  CPC ........... B60W 60/001; B60W 2552/00; B60W 2552/50; G06V 10/2731; G06V 10/44; G06V 20/586; G06V 20/588; G06V 2201/07; B62D 15/0285; Y02T 10/40
  See application file for complete search history.

(56) References Cited

FOREIGN PATENT DOCUMENTS

| | | | |
|---|---|---|---|
| CN | 111152784 A | 5/2020 | |
| CN | 113306549 A | 8/2021 | |
| DE | 602005002000 T2 * | 4/2008 | ......... B62D 15/0245 |
| EP | 3422133 A1 | 1/2019 | |
| JP | 2021094929 A | 6/2021 | |

* cited by examiner

"METHOD AND APPARATUS FOR PLANNING AUTOMATIC PARKING PATH, AND MEDIUM AND DEVICE"

CROSS REFERENCE TO RELATED APPLICATIONS

This application is a continuation of International Application No. PCT/CN2022/083294, filed on Mar. 28, 2022, which claims priority to Chinese Patent Application No. 202111626377.4 entitled "METHOD AND APPARATUS FOR PLANNING AUTOMATIC PARKING PATH, AND MEDIUM AND DEVICE" filed on Dec. 28, 2021 to Chinese Patent Office, the entire content of which is incorporated herein by reference.

TECHNICAL FIELD

The present disclosure relates to the field of self driving technologies, and in particular to a method and an apparatus for planning an automatic parking path, and a medium and a device.

BACKGROUND

Automatic parking is an important function in self driving. In the prior arts, there are many methods of planning an automatic parking path, including a real-time arc method in which, based on a position of a vehicle and a position of a parking place, a pre-planned parking path is obtained by splicing a plurality of arcs under a precondition that collision with a parking space formed by a parking place boundary, a road sideline and an obstacle does not occur and a kinematic constraint is satisfied. In another method of planning an automatic parking path, based on HybridA* search algorithm, a parking path is calculated and planned. In the above two methods, when a parking path is planned, a large space is required. But, due to limitation of specific parking environment, a planning success rate is low and a parking efficiency is also low.

SUMMARY

In order to address the problems in the prior art, the present disclosure provides a method and an apparatus for planning an automatic parking path, a medium and a device, where, by cropping a ground sideline and a road sideline, an available parking space for path planning is increased, so as to increase a path planning success rate, reduce a space required for parking and improve a parking efficiency.

In order to achieve the above objects, the present disclosure provides a technical solution which provides a method of planning an automatic parking path, including:
extracting perception information within a predetermined parking space including a target vehicle place, which is perceived by a vehicle; based on the perception information, identifying a ground sideline of the target parking place, a road sideline and an actual obstacle contour line; cropping the ground sideline and the road sideline intersecting with the ground sideline and taking remaining ground sideline and road sideline as corresponding boundaries of an available parking space of the target parking place; and, performing collision detection based on the corresponding boundaries of the available parking space and the actual obstacle contour line, and based on a result of the collision detection, performing vehicle trajectory planning to obtain an automatic parking planning path.

The present disclosure provides another technical solution which provides an apparatus for planning an automatic parking path, including:
a perceiving module, configured to extract perception information within a predetermined parking space including a target vehicle place, which is perceived by a vehicle; an identifying module, configured to, based on the perception information, identify a ground sideline of the target parking place, a road sideline and an actual obstacle contour line; an available parking space corresponding boundary obtaining module, configured to crop the ground sideline and the road sideline intersecting with the ground sideline and take remaining ground sideline and road sideline as corresponding boundaries of an available parking space of the target parking place; and, a collision detection and planning module, configured to perform collision detection based on the corresponding boundaries of the available parking space and the actual obstacle contour line, and based on a result of the collision detection, perform vehicle trajectory planning to obtain an automatic parking planning path.

The present disclosure provides another technical solution which provides a computer readable storage medium storing a computer instruction which is executed to perform the method of planning an automatic parking path as shown in the above solution.

The present disclosure provides another technical solution which provides a computer device, including a processor and a memory, where the memory stores a computer instruction, which is executed by the processor to perform the method of planning an automatic parking path as shown in the above solution.

The technical solutions of the present disclosure have the following beneficial effects: in the method and apparatus for planning an automatic parking path, the medium and the device, by cropping the ground sideline of the parking place with a side boundary as a ground marking line and the road sideline, the process of planning an automatic parking path in the present disclosure is enabled to have a larger available free parking space than in the prior art, so as to improve a success rate of planning an automatic parking path, reduce a space required for parking and improve a parking efficiency.

BRIEF DESCRIPTION OF THE DRAWINGS

To describe the technical solutions in the embodiments of the present disclosure or in the prior art more clearly, drawings required in descriptions of the embodiments of the present disclosure or the prior art will be briefly introduced below. It is apparent that the drawings described below are merely some embodiments of the present disclosure and other drawings may be obtained by those of ordinary skill in the prior art based on these drawings without making creative work.

The above accompanying drawings show definite embodiments of the present disclosure and more detailed descriptions will be made below. These drawings and text descriptions are not intended to limit the scope of the idea of the present disclosure in any form, but interpret the concepts of the present disclosure for those skilled in the art by referring to the specific embodiments.

DETAILED DESCRIPTION OF THE EMBODIMENTS

Detailed descriptions are made to preferred embodiments of the present disclosure in combination with accompanying drawings, such that the advantages and features of the present disclosure can be more easily understood by those skilled in the art. Thus, the scope of protection of the present disclosure can be more clearly defined.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Figure 1:
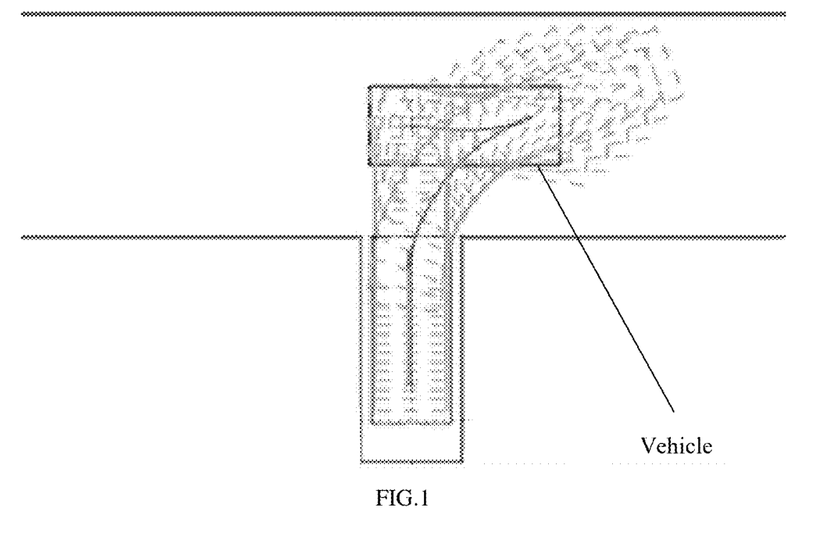
FIG. 1 is a schematic diagram illustrating a use scenario of a method of planning an automatic parking path according to an embodiment of the present disclosure.

Automatic parking is an important function in self driving. In a use scenario as shown in FIG. 1, an automatic parking assistant system (APA) achieves automatic parking by controlling an acceleration, a deceleration and a steering angle of a vehicle. The system performs collision detection through sensors to perceive a parking environment and estimate a vehicle pose (position and driving direction), and then set a target parking place automatically or manually based on selection of a driver. Then, the system calculates an automatic parking path such that the vehicle can achieve fully automatic parking along a defined parking path based on accurate vehicle positioning and the vehicle control system until the target parking place is reached ultimately.

Figure 2:
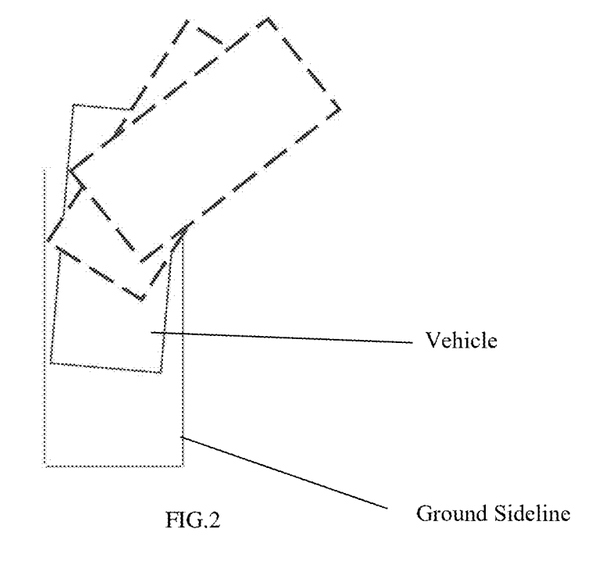
FIG. 2 is a schematic diagram illustrating a ground sideline that a vehicle runs over during a normal parking process according to an embodiment of the present disclosure.

In the prior art, there are many methods of planning an automatic parking path. In the prior art, when sensors are used to perceive environment and perform obstacle detection during a process of planning an automatic parking path, a complete parking place boundary is taken as a parking boundary to perform collision detection with the vehicle so as to avoid collision of the vehicle with the parking place boundary. If the parking place boundary is marked on the ground, a normal parking vehicle may run over the ground sideline as shown in FIG. 2. During the path planning, it is also required to avoid collision of the vehicle with the ground sideline, and otherwise, the actual planning path will not be optimal, the space required for parking will be larger and the success rate of path planning will be lower.

In the present disclosure, the ground sideline of the target parking place can be identified, and a body of the vehicle is allowed to collide with the ground sideline during the path planning, so as to increase an available space for path planning, improve the success rate of planning the parking path, and reduce the space for parking. Ultimately, the planned path will be optimal, and the parking efficiency will be higher.

The technical solutions of the present disclosure will be described below in details in combination with specific embodiments and the drawings. These embodiments below can be combined mutually and same or similar concepts or processes will not be repeated in some embodiments.

Figure 3:
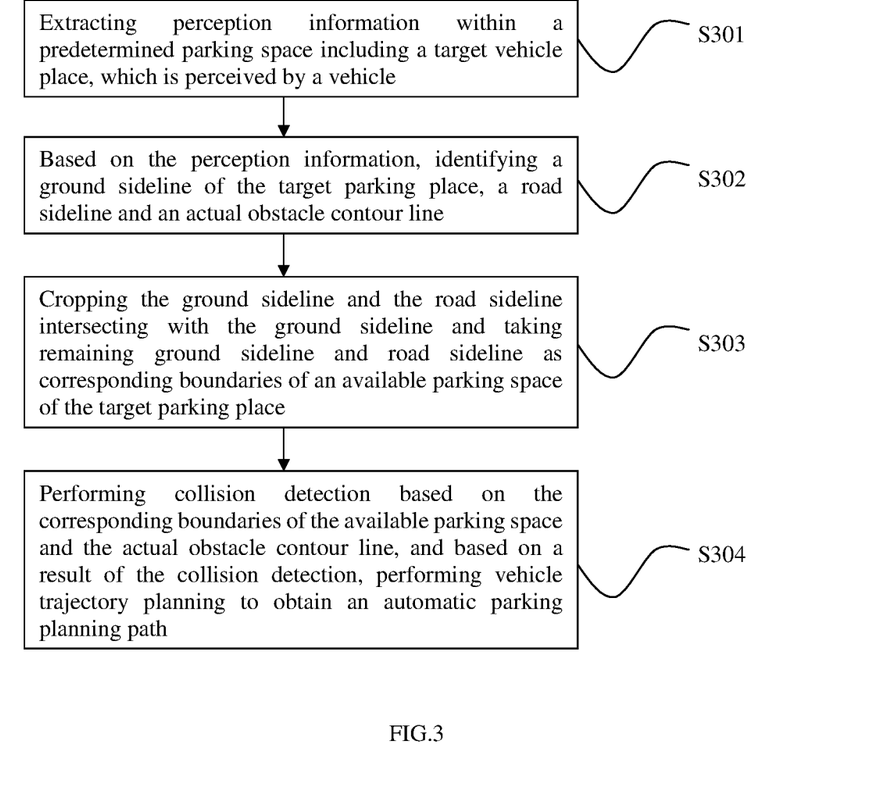
FIG. 3 is a schematic diagram illustrating a specific example of a method of planning an automatic parking path according to an embodiment of the present disclosure.

FIG. 3 is a specific example of a method of planning an automatic parking path according to the present disclosure.

The specific example of the method of planning an automatic parking path according to the present disclosure shown in FIG. 3 includes a process 301 of extracting perception information within a predetermined parking space including a target vehicle place, which is perceived by a vehicle; a process 302 of, based on the perception information, identifying a ground sideline of the target parking place, a road sideline and an actual obstacle contour line; a process 303 of cropping the ground sideline and the road sideline intersecting with the ground sideline and taking remaining ground sideline and road sideline as corresponding boundaries of an available parking space of the target parking place; and a process 304 of performing collision detection based on the corresponding boundaries of the available parking space and the actual obstacle contour line, and based on a result of the collision detection, performing vehicle trajectory planning to obtain an automatic parking planning path.

In the present disclosure, by cropping the ground sideline of the parking place with a side boundary as a ground marking line and the road sideline, the process of planning an automatic parking path in the present disclosure is enabled to have a larger available free parking space than in the prior art, so as to improve the success rate of planning an automatic parking path, reduce the space required for parking and improve the parking efficiency.

The process S301 of extracting the perception information within the predetermined parking space including the target vehicle place, which is perceived by the vehicle, facilitates subsequently identifying the ground sideline of the target parking place, the road sideline and the actual obstacle contour line based on the perception information.

Figure 4:
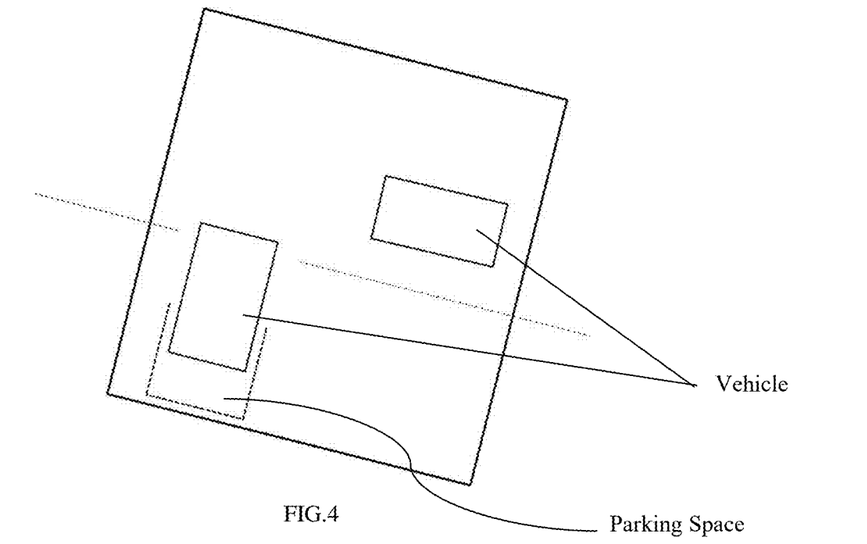
FIG. 4 is a schematic diagram illustrating a predetermined parking space in a specific example of a method of planning an automatic parking path according to an embodiment of the present disclosure.

In a specific example of the present disclosure, the process of extracting the perception information within the predetermined parking space including the target vehicle place, which is perceived by the vehicle, includes: determining the above predetermined parking space based on a size of the vehicle and a minimum turning radius. As shown in FIG. 4, for example, the above parking environment scope can be determined as a square of 30 m×30 m based on empirical value, or determined as a square with a side length being a vehicle length+the minimum turning radius.

In a specific example of the present disclosure, the process of extracting the perception information within the predetermined parking space including the target vehicle place, which is perceived by the vehicle, includes: obtaining an image of a physical environment where the vehicle is located by using at least one sensor disposed on the vehicle, and extracting a parking-related object such that the ground sideline is cropped after being identified. Specifically, the above vehicle may be any type of vehicle which carries persons or articles and moves by a power system such as engine or battery or the like, including but not limited to a sedan, a truck, a bus, an electric car, a motorbike, a recreational vehicle, and train and the like. The above image includes a parking-related object, for example, a parking place boundary including columns, cone barrels and sidelines and the like; and a parking-unrelated object, for example, other vehicles and scenery. Therefore, it is required to identify the parking-related object from a large number of objects.

Optionally, the above at least one sensor may include an Around View Monitor Camera (AVM) and an ultrasonic radar (USS).

In a specific example of the present disclosure, the above process of extracting the parking-related object includes a parking place detection, an obstacle detection and a ground connection line detection. Specifically, the above parking place detection process includes detection for the parking place boundary; the above obstacle detection process includes detection for other vehicles, persons and cone barrels and the like within a predetermined scope; the above ground connection line detection process includes detection for contact boundaries between the ground and the buildings such as wall surfaces, columns and the like within a predetermined scope.

In a specific example of the present disclosure, the above process of extracting the parking-related object further includes an object fusion process in which a plurality of pieces of object information perceived by a plurality of cameras are fused into one piece of object information; for example, same pieces of obstacle information taken by a plurality of cameras are fused into one piece of obstacle information for output; a camera-perceived result and an ultrasonically-perceived result are fused, for example, parking place information taken by the camera and parking place information taken by the ultrasonic radar are fused into one piece of parking place information for output; or, a plurality of frames of perception information are fused into one piece of information, for example, a plurality of frames of pictures of a same piece of ground connection line information taken by one camera are fused into one piece of obstacle information for output. In this way, more stable and accurate object information can be obtained.

The process S302 of, based on the perception information, identifying the ground sideline of the target parking place, the road sideline and the actual obstacle contour line facilitates constructing a parking space boundary based on the identified ground sideline, road sideline and actual obstacle contour line.

Specifically, the process of identifying the ground sideline of the target parking place based on the perception information includes determining whether the boundary of the parking place is a ground marking line. In an actual parking scene, the boundary of the parking place may include one ground sideline or both side boundaries are ground sidelines.

In a specific example of the present disclosure, the above process of identifying the actual obstacle contour line based on the perception information includes identifying a contour of a fixed obstacle, for example, identifying a contour of an obstacle such as a wall, a column, a cone barrel or the like.

In a specific example of the present disclosure, the above process of identifying the actual obstacle contour line based on the perception information includes identifying a contour of a moving obstacle, for example, identifying a person, a vehicle or an animal appearing in the predetermined parking space.

The process S303 of cropping the ground sideline and the road sideline intersecting with the ground sideline and taking remaining ground sideline and road sideline as corresponding boundaries of an available parking space of the target parking place is performed such that collision detection is subsequently performed based directly on the corresponding boundaries of the available parking space formed by the remaining ground sideline and road sideline. Ultimately, the planned path will reach the optimal and the available space for parking is increased, and the success rate of planning the parking path is improved.

Specifically, the boundaries of the above available parking space may further include an actual boundary of an actual obstacle such as a cone barrel, a wall and a column and the like. In an actual parking process, it is required to avoid collision with the boundaries of the parking space.

In a specific example of the present disclosure, if one of the side boundaries of the target parking place is a ground marking line and the other boundary is a wall or another obstacle, the above process of cropping the ground sideline includes: only cropping the ground sideline with the ground marking line as a boundary.

In a specific example of the present disclosure, if both side boundaries of the target parking place are ground sidelines as boundaries, the above process of cropping the ground sideline includes: based on a size of a vehicle to be parked and a size of the target parking place, cropping one of the two sidelines of the target parking place. Specifically, in a parking process, if the vehicle to be parked has a smaller size and the target parking place is wider and the vehicle to be parked is closer to the parking place, the sideline closer to the vehicle is cropped such that a shortest parking path along which the vehicle can be directly and obliquely parked into the parking place without being driven back and forth can be planned. In this way, the available parking space for planning a parking path can be increased, the success rate of planning a parking path can be increased and the parking efficiency is improved.

In a specific example of the present disclosure, if both side boundaries of the target parking place are ground sidelines as boundaries, the above process of cropping the ground sideline includes: cropping both ground sidelines. Specifically, in an actual parking process, if the vehicle to be parked has a larger size and the target parking place is narrower, and the vehicle to be parked is closer to the parking place, the vehicle can be successfully parked directly and obliquely along an ideal path without being driven back and forth. But, in the parking process, the vehicle may run over both sidelines at the same time, and thus the sidelines can be cropped before subsequent collision detection and path planning. In this way, the available parking space for planning a parking path can be increased, the success rate of planning a parking path can be increased and the parking efficiency is improved.

In a specific example of the present disclosure, the above process of cropping the ground sideline and the road sideline intersecting with the ground sideline includes: cropping off 0.3 to 1 times of a length of the ground sideline by starting from a part of the ground sideline close to the road sideline; and, cropping off 0.5 to 1.5 times of a length of the cropped ground sideline by starting from a part of the road sideline interacting with the ground sideline close to the ground sideline. When more than 0.3 times of an outer side of the ground sideline of the parking place is cropped and the ground marking line intersecting with the ground sideline is cropped based on 0.5 to 1.5 times of the length of the cropped ground sideline, the success rate of planning a parking path can be significantly increased and the parking efficiency is improved.

Preferably, the above process of cropping the ground sideline and the road sideline intersecting with the ground sideline includes: cropping off 0.3 to 0.5 times of the length of the ground sideline by starting from a part of the ground sideline close to the road sideline. When the length of the retained sideline is less than 0.5 times of the length of the original sideline, the success rate of planning a parking path will no longer be increased. Specifically, the movement of the vehicle needs to satisfy a kinematic constraint. Hence, planning a parking path based on the kinematic constraint determines that, when the length of the ground sideline of the target parking place is cropped to less than a given value, continued cropping will be no longer helpful to increasing the success rate of planning a parking path.

The process S304 of performing collision detection based on the corresponding boundaries of the available parking space and the actual obstacle contour line, and based on the result of the collision detection, performing vehicle trajectory planning to obtain an automatic parking planning path is performed such that one parking path intersecting with the original ground sideline of the parking place can be planned with a high success rate. In a parking process, the efficient parking can be achieved and collision with an obstacle can be avoided.

In a specific example of the present disclosure, the process of performing collision detection based on the corresponding boundaries of the available parking space and the actual obstacle contour line includes: by using an actual contour of the vehicle, performing collision detection on the corresponding boundaries of the available parking space and the actual obstacle contour line.

Figure 5:
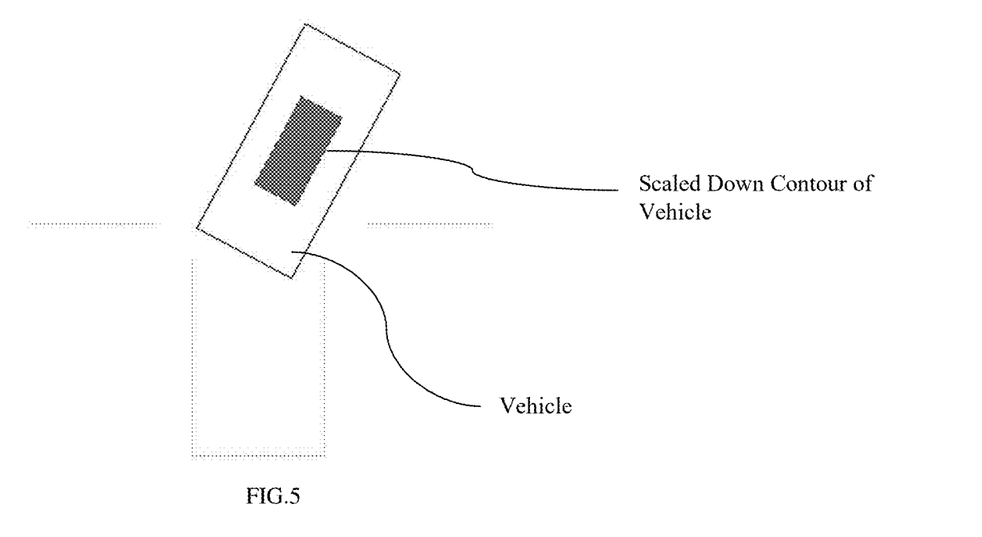
FIG. 5 is a schematic diagram illustrating a scaled-down contour of a vehicle used in a specific example of a method of planning an automatic parking path according to an embodiment of the present disclosure.

In a specific example of the present disclosure, the process of performing collision detection based on the corresponding boundaries of the available parking space and the actual obstacle contour line includes: by using a scaled-down contour of the vehicle, performing collision detection on the corresponding boundaries of the available parking space; and, by using the actual contour of the vehicle, performing collision detection on the actual obstacle contour line. In the present embodiment, the above corresponding boundaries of the available parking space do not include an actual obstacle such as a cone barrel, a wall and a column and the like. In a specific parking process, performing collision detection on the boundary of the available parking space by using the scaled-down contour of the vehicle means that the vehicle may further run over more of the two-dimensional parking place sidelines and the road sideline on the ground as shown in FIG. 5. In this way, the available parking space for parking a vehicle can be increased, the success rate of planning a parking path can be increased and the parking efficiency is improved.

In a specific example of the present disclosure, the scaled-down contour of the vehicle is a virtual vehicle contour obtained by scaling the vehicle down to no greater than 0.8 times of the actual contour of the vehicle with a center of the vehicle as center. Starting from the contour of the vehicle being less than 0.8 times, the success rate of the planning a parking path is significantly increased.

Preferably, the scaled-down contour of the vehicle is a virtual vehicle contour obtained by scaling the vehicle down to no greater than 0.5 times of the actual contour of the vehicle with the center of the vehicle as center. Starting from the contour of the vehicle being less than 0.5 times, the success rate of the planning a parking path is increased at a more significant speed.

In a specific example of the present disclosure, the above process of performing vehicle trajectory planning based on the result of the collision detection to obtain the automatic parking planning path includes: based on the result of the collision detection, performing path planning by using real-time arc method.

In a specific example of the present disclosure, the above process of performing vehicle trajectory planning based on the result of the collision detection to obtain the automatic parking planning path includes: based on the result of the collision detection, calculating and planning a parking path by using HybridA* search algorithm.

In a specific example of the present disclosure, in a parking scenario where parking is carried out at a higher frequency, for example, in a household garage, the method of planning an automatic parking path in the present disclosure further includes: storing a parking path obtained by carrying out the above automatic parking path planning such that the stored parking path can be directly invoked to perform later parking.

Figure 6:
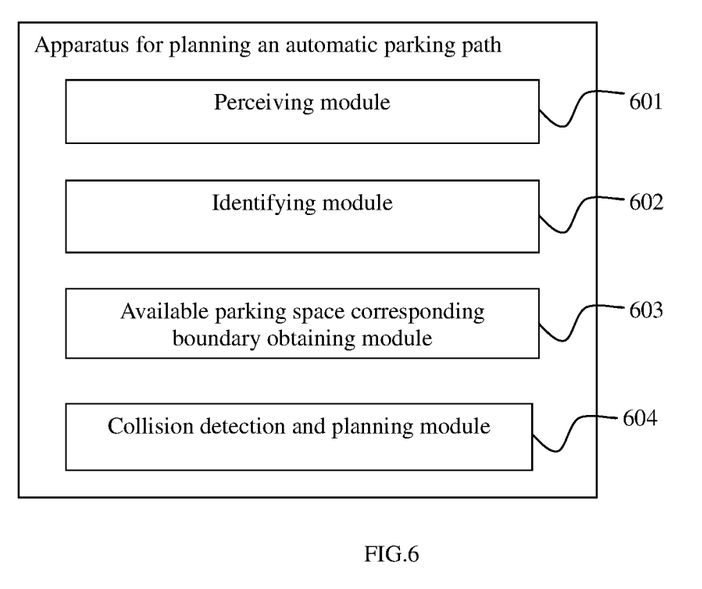
FIG. 6 is a schematic diagram illustrating a specific example of a method of planning an automatic parking path according to an embodiment of the present disclosure.

FIG. 6 shows a specific example of an apparatus for planning an automatic parking path according to the present disclosure.

The specific example of the apparatus for planning an automatic parking path according to the present disclosure as shown in FIG. 6 includes:

a perceiving module 601, configured to extract perception information within a predetermined parking space including a target vehicle place, which is perceived by a vehicle; an identifying module 602, configured to, based on the perception information, identify a ground sideline of the target parking place, a road sideline and an actual obstacle contour line; an available parking space corresponding boundary obtaining module, configured to crop the ground sideline and the road sideline intersecting with the ground sideline and take remaining ground sideline and road sideline as corresponding boundaries of an available parking space of the target parking place; and, a collision detection and planning module, configured to perform collision detection based on the corresponding boundaries of the available parking space and the actual obstacle contour line, and based on a result of the collision detection, perform vehicle trajectory planning to obtain an automatic parking planning path.

In the present disclosure, by cropping the ground sideline of the parking place with a side boundary as a ground marking line and the road sideline, the process of planning an automatic parking path in the present disclosure is enabled to have a larger available free parking space than in the prior art, so as to improve the success rate of planning an automatic parking path, reduce the space required for parking and improve the parking efficiency.

The perceiving module 601 configured to extract the perception information within the predetermined parking space including the target vehicle place, which is perceived by the vehicle facilitates subsequently identifying the ground sideline of the target parking place, the road sideline and the actual obstacle contour line based on the perception information. In a specific example of the present disclosure, the perceiving module 601 includes at least one sensor disposed on the vehicle, for example, Around View Monitor (AVM) camera and an ultrasonic radar (USS).

The identifying module 602 configured to identify the ground sideline of the target parking place, the road sideline and the actual obstacle contour line based on the perception information facilitates constructing a parking space boundary based on the identified ground sideline, road sideline and actual obstacle contour line.

The available parking space corresponding boundary obtaining module 603 is configured to crop the ground sideline and the road sideline intersecting with the ground sideline and take remaining ground sideline and road sideline as corresponding boundaries of an available parking space of the target parking place such that collision detection is subsequently performed based directly on the corresponding boundaries of the available parking space formed by the remaining ground sideline and road sideline. Ultimately, the planned path will reach the optimal and the available space for parking is increased, and the success rate of planning the parking path is improved.

The collision detection and planning module 604 is configured to perform collision detection based on the corresponding boundaries of the available parking space and the actual obstacle contour line, and based on the result of the collision detection, perform vehicle trajectory planning to obtain an automatic parking planning path, such that one parking path intersecting with the original ground sideline of the parking place can be planned with a high success rate. In a parking process, the efficient parking can be achieved and collision with an obstacle can be avoided.

In a specific example of the present disclosure, the process that the collision detection and planning module 604 performs vehicle trajectory planning based on the result of the collision detection to obtain the automatic parking planning path includes: based on the result of the collision detection, performing path planning by using real-time arc method.

In a specific example of the present disclosure, the collision detection and planning module 604 can calculate and plan a parking path based on the result of the collision detection by using HybridA* search algorithm.

In a specific example of the present disclosure, in a parking scenario where parking is carried out at a higher frequency, for example, in a household garage, the apparatus for planning an automatic parking path in the present disclosure further includes: a path storing apparatus configured to store a parking path obtained by carrying out the above automatic parking path planning such that the stored parking path can be directly invoked to perform later parking.

The apparatus for planning an automatic parking path provided by the present disclosure is configured to perform the method of planning an automatic parking path according to any one of the above embodiments, where the implementation principle and the technical effects are similar and will not be repeated herein.

In a specific example of the present disclosure, each functional module in the apparatus for planning an automatic parking path according to the present disclosure may be directly disposed in hardware, or software executable by a processor or in a combination thereof.

The software module may reside in Random Access Memory (RAM), Read Only Memory (ROM), Erasable Programmable Read-Only Memory (EPROM), Electrically Erasable Programmable Read-Only Memory (EEPROM), register, hard disk, removable disk, CD-ROM or any other type of storage medium known in the technology. The exemplary storage medium is coupled to a processor such that the processor reads information from the storage medium and writes information into the storage medium.

The processor mentioned above may be a Central Processing Unit (CPU), a general-purpose processor, a Digital Signal Processor (DSP), an Application-Specific Integrated Circuit (ASIC), a Field Programmable Gate Array (FPGA), or another programmable logic device, discrete gate or transistor logic, discrete hardware component or any other combination or the like. The general processor may be a microprocessor. In an optional solution, the processor may be any conventional processor, controller, microcontroller or state machine. The processor may also be implemented as a combination of computing apparatuses, for example, a combination of DSP and microprocessor, multiple microprocessors, one or more of the above microprocessors combining the core of the DSP, or any other such configuration. In an optional solution, the storage medium and the processor may be combined integrally. The processor and the storage medium may reside in ASIC which may reside in a user terminal. In an optional solution, the processor and the storage medium may reside as discrete components in a user terminal.

In another specific example of the present disclosure, there is provided a computer readable storage medium, storing a computer instruction, which is executed to perform the method of planning an automatic parking path as shown in the above solutions.

In another specific example of the present disclosure, there is provided a computer device, including a processor and a memory, where the memory stores a computer instruction which is executed to perform the method of planning an automatic parking path as shown in the above solutions.

In several embodiments provided by the present disclosure, it should be understood that the disclosed apparatus and method may be implemented in other manners. For example, the apparatus embodiments described above are merely illustrative, for example, division of units is only a logical functional division and may be another division in actual implementation. For example, multiple units or components may be combined or integrated into another system or some features may be neglected, or not executed. For another point, mutual coupling or direct coupling or communication connection displayed or discussed may be achieved through some communication interfaces, and indirect coupling or communication connection of the apparatus or units may be in electrical or mechanical or other form.

The units described as separate members may be or not be physically separated, and the members displayed as units may be or not be physical units, i.e., may be located in one place, or may be distributed to a plurality of network units. Part or all of the units may be selected according to actual requirements to implement the objectives of the solutions in the embodiments.

Above descriptions are made only to embodiments of the present disclosure and such embodiments shall not be considered as limiting the scope of protection of the present disclosure. Direct or indirect employment of any equivalent structure transformations made based on the specification and drawings of the present disclosure in other relevant technical fields shall be encompassed in the scope of protection of the present disclosure.

What is claimed is:

1. A method of planning an automatic parking path, comprising:
    extracting perception information within a predetermined parking space comprising a target vehicle place, which is perceived by a vehicle;

based on the perception information, identifying a ground sideline of the target parking place, a road sideline and an actual obstacle contour line;

cropping the ground sideline and the road sideline intersecting with the ground sideline and taking remaining ground sideline and road sideline as corresponding boundaries of an available parking space of the target parking place; and, performing collision detection based on the corresponding boundaries of the available parking space and the actual obstacle contour line, and based on a result of the collision detection, performing vehicle trajectory planning to obtain an automatic parking planning path, wherein cropping the ground sideline and the road sideline intersecting with the ground sideline comprises:

cropping off 0.3 to 1 times of a length of the ground sideline by starting from a part of the ground sideline close to the road sideline; and cropping off 0.5 to 1.5 times of a length of the cropped ground sideline by starting from a part of the road sideline interacting with the ground sideline close to the ground sideline.

2. The method of claim 1, wherein cropping the ground sideline and the road sideline intersecting with the ground sideline comprises:

cropping off 0.3 to 0.5 times of the length of the ground sideline by starting from the part of the ground sideline close to the road sideline.

3. The method of claim 1, wherein the process of performing the collision detection based on the corresponding boundaries of the available parking space and the actual obstacle contour line comprises:

by using an actual contour of the vehicle, performing collision detection on the corresponding boundaries of the available parking space and the actual obstacle contour line.

4. The method of claim 1, wherein performing the collision detection based on the corresponding boundaries of the available parking space and the actual obstacle contour line comprises:

by using a scaled-down contour of the vehicle, performing collision detection on the corresponding boundaries of the available parking space; and, by using the actual contour of the vehicle, performing collision detection on the actual obstacle contour line.

5. The method of claim 4, wherein the scaled-down contour of the vehicle is a virtual vehicle contour obtained by scaling the vehicle down to no greater than 0.8 times of the actual contour of the vehicle with a center of the vehicle as center.

6. The method of claim 5, wherein the scaled-down contour of the vehicle is a virtual vehicle contour obtained by scaling the vehicle down to no greater than 0.5 times of the actual contour of the vehicle with the center of the vehicle as center.

7. An apparatus for planning an automatic parking path, comprising:

one or more processors, and a non-transitory storage medium in communication with the one or more processors, the non-transitory storage medium configured to store program instructions, wherein, when executed by the one or more processors, the instructions cause the apparatus to perform:

extracting perception information within a predetermined parking space comprising a target vehicle place, which is perceived by a vehicle;

based on the perception information, identifying a ground sideline of the target parking place, a road sideline and an actual obstacle contour line;

cropping the ground sideline and the road sideline intersecting with the ground sideline and take remaining ground sideline and road sideline as corresponding boundaries of an available parking space of the target parking place; and, performing collision detection based on the corresponding boundaries of the available parking space and the actual obstacle contour line, and based on a result of the collision detection, perform vehicle trajectory planning to obtain an automatic parking planning path, wherein cropping the ground sideline and the road sideline intersecting with the ground sideline specifically comprises:

cropping off 0.3 to 1 times of a length of the ground sideline by starting from a part of the ground sideline close to the road sideline; and, cropping off 0.5 to 1.5 times of a length of the cropped ground sideline by starting from a part of the road sideline interacting with the ground sideline close to the ground sideline.

8. The apparatus of claim 7, wherein cropping off 0.3 to 1 times of the length of the ground sideline by starting from a part of the ground sideline close to the road sideline specifically comprises:

cropping off 0.3 to 0.5 times of the length of the ground sideline by starting from the part of the ground sideline close to the road sideline.

9. The apparatus of claim 7, wherein performing the collision detection based on the corresponding boundaries of the available parking space and the actual obstacle contour line comprises:

by using an actual contour of the vehicle, performing collision detection on the corresponding boundaries of the available parking space and the actual obstacle contour line.

10. The apparatus of claim 7, wherein performing the collision detection based on the corresponding boundaries of the available parking space and the actual obstacle contour line comprises:

by using a scaled-down contour of the vehicle, performing collision detection on the corresponding boundaries of the available parking space; and, by using the actual contour of the vehicle, performing collision detection on the actual obstacle contour line.

11. A non-transitory computer readable storage medium, storing a computer instruction, wherein the computer instruction is executed to perform the method of planning an automatic parking path, which comprises:

extracting perception information within a predetermined parking space comprising a target vehicle place, which is perceived by a vehicle;

based on the perception information, identifying a ground sideline of the target parking place, a road sideline and an actual obstacle contour line;

cropping the ground sideline and the road sideline intersecting with the ground sideline and taking remaining ground sideline and road sideline as corresponding boundaries of an available parking space of the target parking place; and, performing collision detection based on the corresponding boundaries of the available parking space and the actual obstacle contour line, and based on a result of the collision detection, performing vehicle trajectory planning to obtain an automatic parking planning path, wherein cropping the ground sideline and the road sideline intersecting with the ground sideline comprises:
cropping off 0.3 to 1 times of a length of the ground sideline by starting from a part of the ground sideline close to the road sideline; and
cropping off 0.5 to 1.5 times of a length of the cropped ground sideline by starting from a part of the road sideline interacting with the ground sideline close to the ground sideline.

* * * * *